United States Patent [19]

Gorman et al.

[11] Patent Number: 4,497,980

[45] Date of Patent: Feb. 5, 1985

[54] HANDSFREE CIRCUIT FOR TELEPHONE INSTRUMENT

[75] Inventors: Patrick R. Gorman; William O. Stottlemyer, both of Corinth, Miss.

[73] Assignee: ITT Corporation, New York, N.Y.

[21] Appl. No.: 505,428

[22] Filed: Jun. 16, 1983

[51] Int. Cl.³ .............................................. H04M 9/08
[52] U.S. Cl. ................................ 179/81 B; 179/100 L
[58] Field of Search ............... 179/81 B, 84 C, 84 SS, 179/84 R, 81 R, 100 L

[56] References Cited

U.S. PATENT DOCUMENTS 4,115,659 9/1978 Spanel et al. .................... 179/81 B Primary Examiner—Gene Z. Rubinson
Assistant Examiner—James L. Dwyer
Attorney, Agent, or Firm—John T. O'Halloran; Jeffrey P. Morris

[57] ABSTRACT

A handsfree or loudspeaking telephone circuit employing loudest speaker comparison for controlling the direction of transmission of speech signals. The circuit employs the speech network for the handset to provide gain and hybrid functions. The circuit contains logic for controlling the switching between handset operation, handsfree operation and call announcing operation.

6 Claims, 7 Drawing Figures

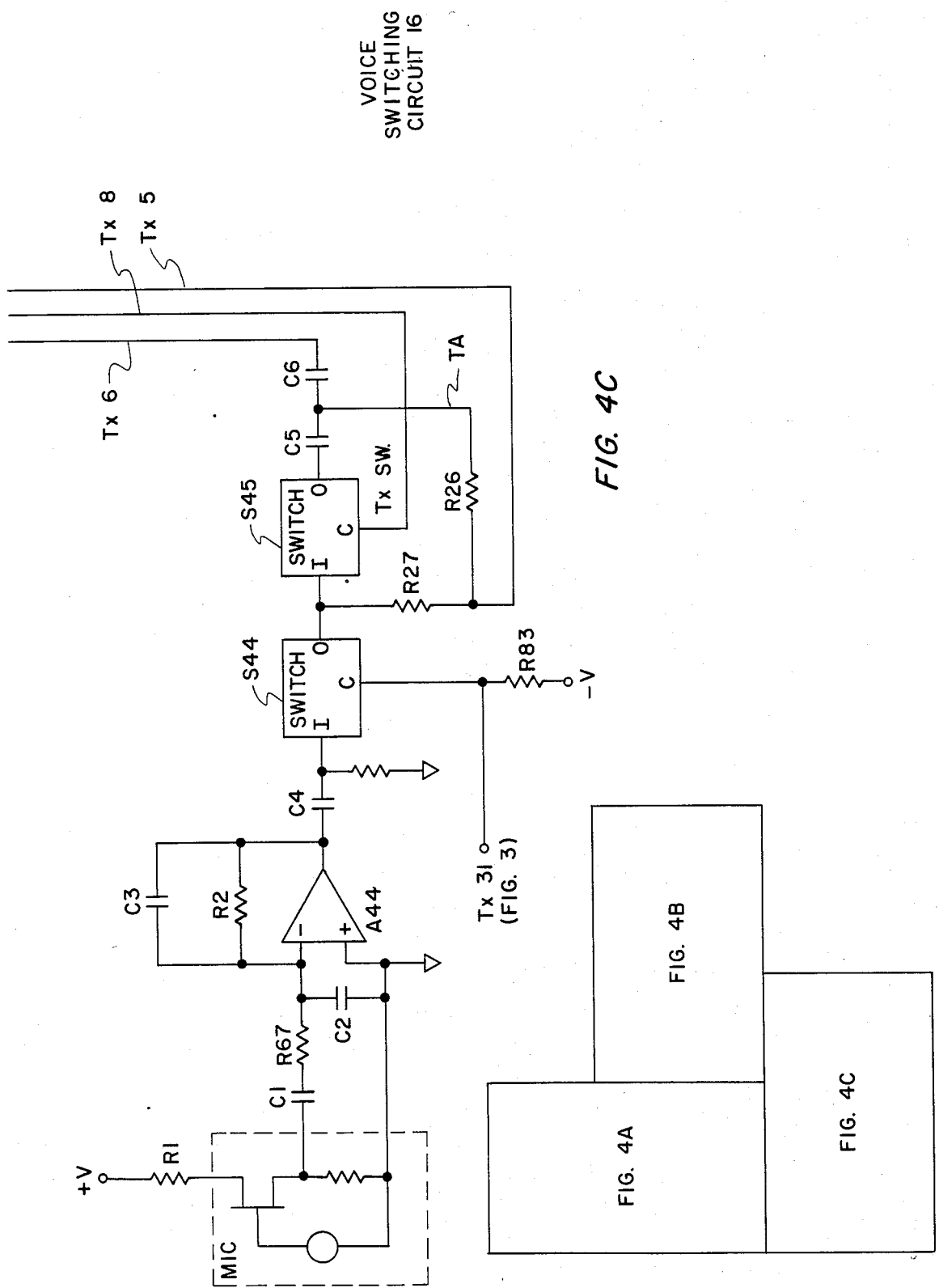

HANDSFREE CIRCUIT FOR TELEPHONE INSTRUMENT

BACKGROUND OF THE INVENTION

Handsfree or loudspeaking telephone instruments using amplitude controlled switching of the voice channels are, of course, well known. In such circuits, a voice signal generated locally for transmission is compared against a voice signal being received for amplitude and the path for the louder signal is switched on while the lesser signal path is attenuated. The comparison continues and the circuit switches to pass the lesser signal when in fact it becomes the louder signal. In one form of this circuit, as shown in U.S. Pat. No. 3,725,585 issued to Moniak et al. Apr. 3, 1973, an incremental signal is added to the louder signal to provide a higher threshold which must be overcome by the then lesser signal to cause a switch over.

When a handsfree or loudspeaking instrument feature is to be applied to a telephone instrument of the type shown by U.S. Pat. No. 4,315,110 issued to J. Davis Feb. 9, 1982, provision must be made for transforming hookswitch signals in data form into operative signals for handsfree operation.

Further, electronic subsets using dynamic transducers employ electronic speech or voice networks which may be of the type shown by U.S. Pat. No. 4,286,123 issued to P. Blomley Aug. 25, 1981. Such voice networks may provide interfacing with the telephone dial especially a dial of the DTMF (dual tone multi-frequency) type to enable the DTMF signals to pass through the speech network to the lines.

A feature which has become popular in PBX systems with current electromagnetic and electronic subsets is that of call announcing. With this feature, a loudspeaker at stations so equipped is accessed for a timed period to allow a message of limited duration to be broadcast by the speaker when the called station is on-hook. A variation on this feature, two-way call announcing, allows the called station to respond through a microphone associated with the instrument.

SUMMARY OF THE INVENTION

The present invention is directed to an improved speech or voice controlled handsfree switching circuit for use with electronic subset instruments. The voice switching circuit is downstream of the speech network of the instrument so that one speech network only need be provided to accommodate the normal handset transducers, and in addition, the handsfree and call announcing, if available. The gain control of the speech network can be employed for both the handset transducers and for the handsfree. In this way, the need for a separate handsfree hybrid circuit of the electromechanical type shown by the cited U.S. Pat. No. 3,725,585 patent or of the electronic type is eliminated.

The present invention provides a circuit for a telephone instrument having the normal handset mode of operation and in addition a call announcer and handsfree capability both using a common loudspeaker. The handsfree circuit uses a voice switched control. In the call announce mode, the voice control switching is biased in the transmit direction. For handsfree operation, the bias is removed so that initially both transmit and receive paths have equal availability.

Disclosed is a basic voice controlled switching circuit for a handsfree or loudspeaking telephone with call announce capability in addition to the normal handset transmitter and receiver. When the circuit is placed in the handsfree mode with the handset on-hook, a relay is operated to switch the voice controlled switching network into operation. The voice controlled network is activated downstream of the handset speech network to allow use of many of the functions of the handset speech network. Placing the call in the handsfree mode disables the handset, bypasses the hookswitch access to the speech network and activates the speech amplitude comparison network for voice control.

In addition, the circuit allows two way call announcing from the line either over the voice pair or over a separate call announce pair, if available. A paging or all call is available using either the voice pair or a separate call announce pair, if available. Background music may be applied to the speaker during an idle or non-use condition in response to a proper input signal. For all these handsfree or call announce conditions, the speech network is used to provide gain and hybrid functions.

DETAILED DESCRIPTION

Figure 1:
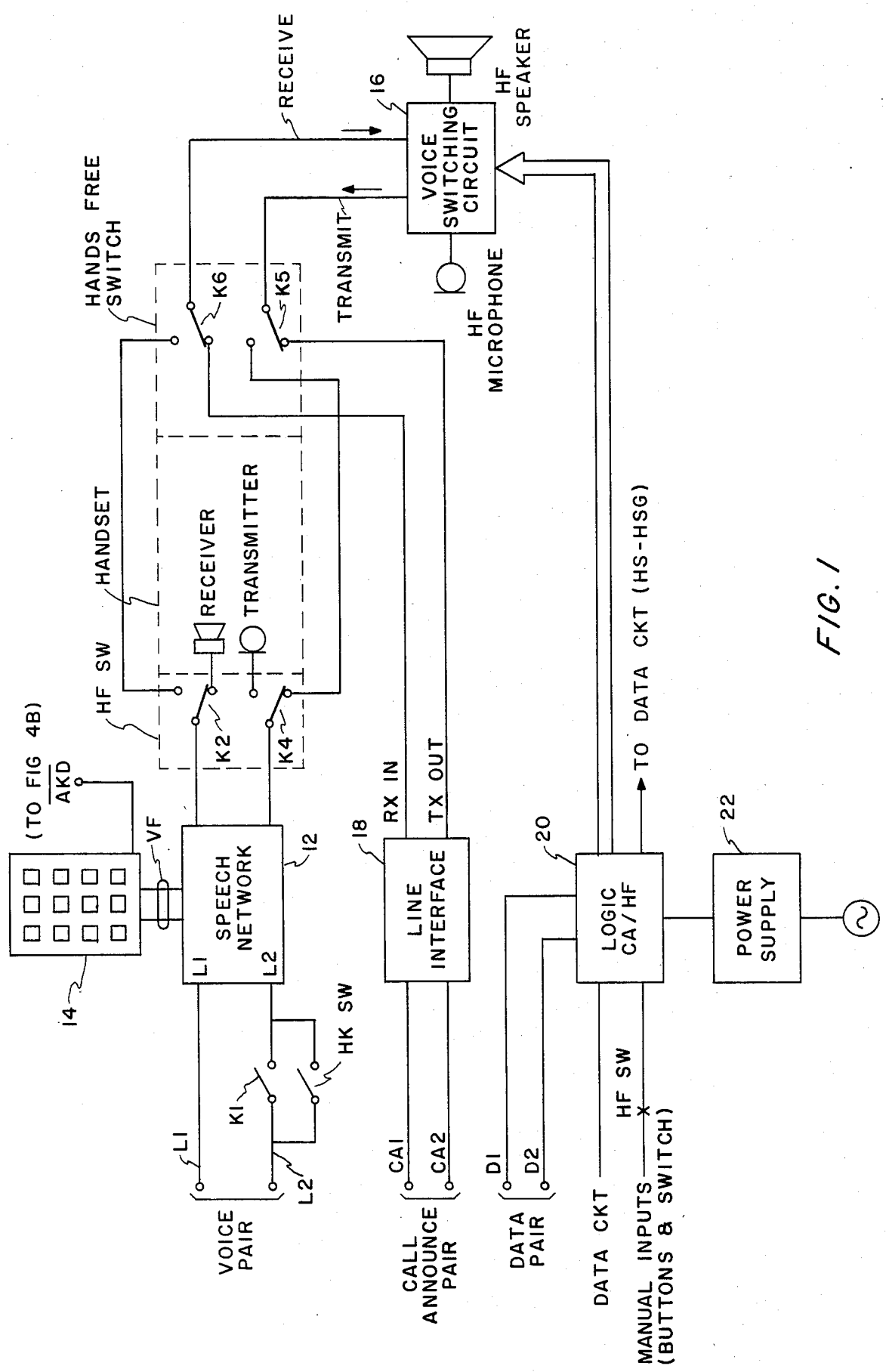
FIG. 1 is a schematic block diagram of the circuit of the present invention.

In the block diagram of FIG. 1 is shown a circuit including the speech portion of a telephone instrument adapted for use in three modes, the handset mode, the handsfree mode or the call announce mode. The interconnection of the instrument to the telephone system may be over two leads—the voice pair L1 and L2, may be over four leads—the voice pair and a data pair D1 and D2, or over six leads—a voice pair, a data pair and a call announce pair CA1 and CA2. The telephone instrument preferably is of the electronic type using linear transducers, such as dynamic or electret types, for the handset transmitter and receiver, and draws its operating current for handset operation from the line.

Briefly defining the modes described in this specification, there are the handset mode, handsfree mode, two way call announce and all call.

The handset mode is the standard mode of telephone operation. The handset transmitter and receiver are used for the bidirectional transfer of voice or speech messages with the handset off hook.

The handsfree mode is a locally generated mode also called the loudspeaking mode since a loudspeaker and microphone are used for speech messages. The handsfree mode for the present instrument is enabled in response to depression of a switch at the telephone instrument and is effective regardless of the condition of the handset—on hook or off hook.

The call announce mode is initiated locally at a calling station within a PBX or hybrid PBX/key system to signal an incoming call to the loudspeaker at a called station. The condition of the handset is unimportant where four wire call announcing is used.

An all call mode is a paging mode in which a call is sent to the loudspeakers at all stations equipped with loudspeakers.

As shown in FIG. 1 for a phone instrument with separate data and voice leads, the voice pair L1 and L2 from the system line terminates on the line side leads of a speech network 12, the lead L2 having parallel contacts, i.e., normally open contacts K1 of a handsfree switching relay RLY-1 (FIG. 2) and normally open hookswitch contacts HKSW. Thus, the voice pair is completed to the speech network either when the hookswitch is off hook or when the handsfree switch is closed. Note that in this type of instrument with separate data leads, ringing input is received over the data leads.

The speech network may be of the type shown in cited patent No. 4,286,123 to Blomley and has a VF lead or lead pair connected to a DTMF key pad 14. The key pad may be of any conventional type which produces two selected frequency tones in response to depression of a selected button on the key pad for transmission of the tones to the line conductors L1 and L2.

The speech network 12 provides a number of functions such as, (a) line interface or supervision, (b) line driving, (c) speech gain regulation, (d) anti side tone circuits, and (e) transmit gain and dial interfacing including dial muting and confidence tone. The speech network is powered over the line pair. The speech network has a normal output path to the handset receiver and transmitter, the path passing through normally closed contacts controlled by the handsfree switch. With the handsfree switch closed, transmit and receive paths are closed between the speech network and the voice switching circuit 16 (shown in detail in FIGS. 4A–C) for comparison of the amplitude of speech signals in the transmit and receive paths and resultant switching of the louder path. For the handsfree mode, the network 12 provides gain for any speech thereby reducing the need for gain in the transmitter Tx network.

For the call announce feature, there is a line interface circuit 18 controlling the path between the call announce pair (if available in the system) and the speaker under the control of the handsfree control voice switching circuit 16.

Logic circuit 20 responds to the input signals and manual control switches to initiate the call announce mode and the handsfree mode.

Figure 2:
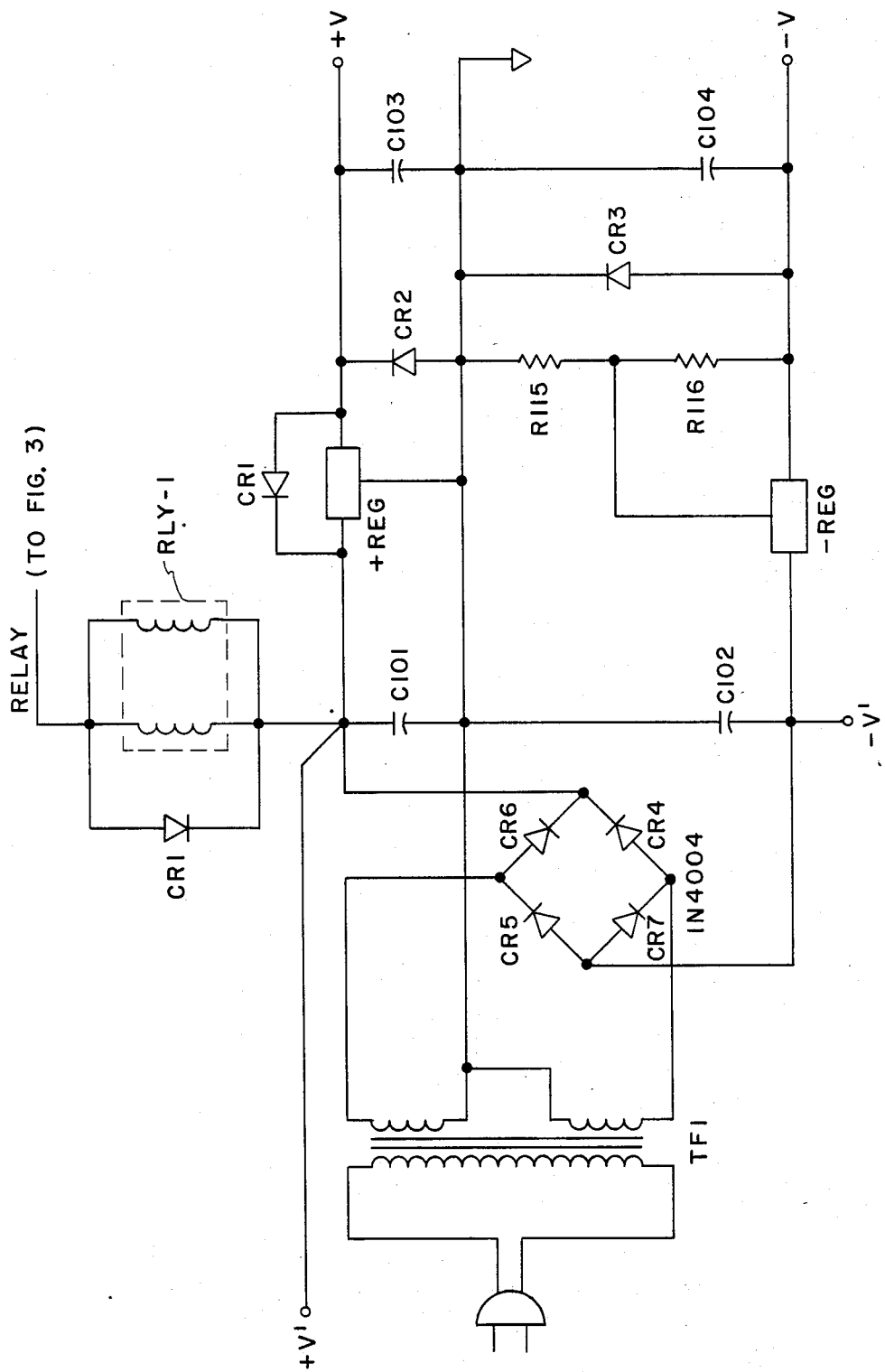
FIG. 2 is a schematic circuit diagram of a power supply circuit of FIG. 1.

The power supply 22 is shown in detail in FIG. 2 powered by a source of 110 volt AC and a step down transformer TF1 which is centertapped to provide a circuit ground. Across the transformer output is a rectifier bridge CR4–CR7 with positive and negative regulators Reg.+ and Reg.— in the respective bridge outputs and various noise filtering components in the paths to the +V and −V outputs of the power supply. Coupled to the positive unregulated lead is one side of the handsfree relay RLY 1, the relay having eight sets of contacts K1–K8. The power supply powers the handsfree circuit of FIGS. 3 and 4.

Figure 3:
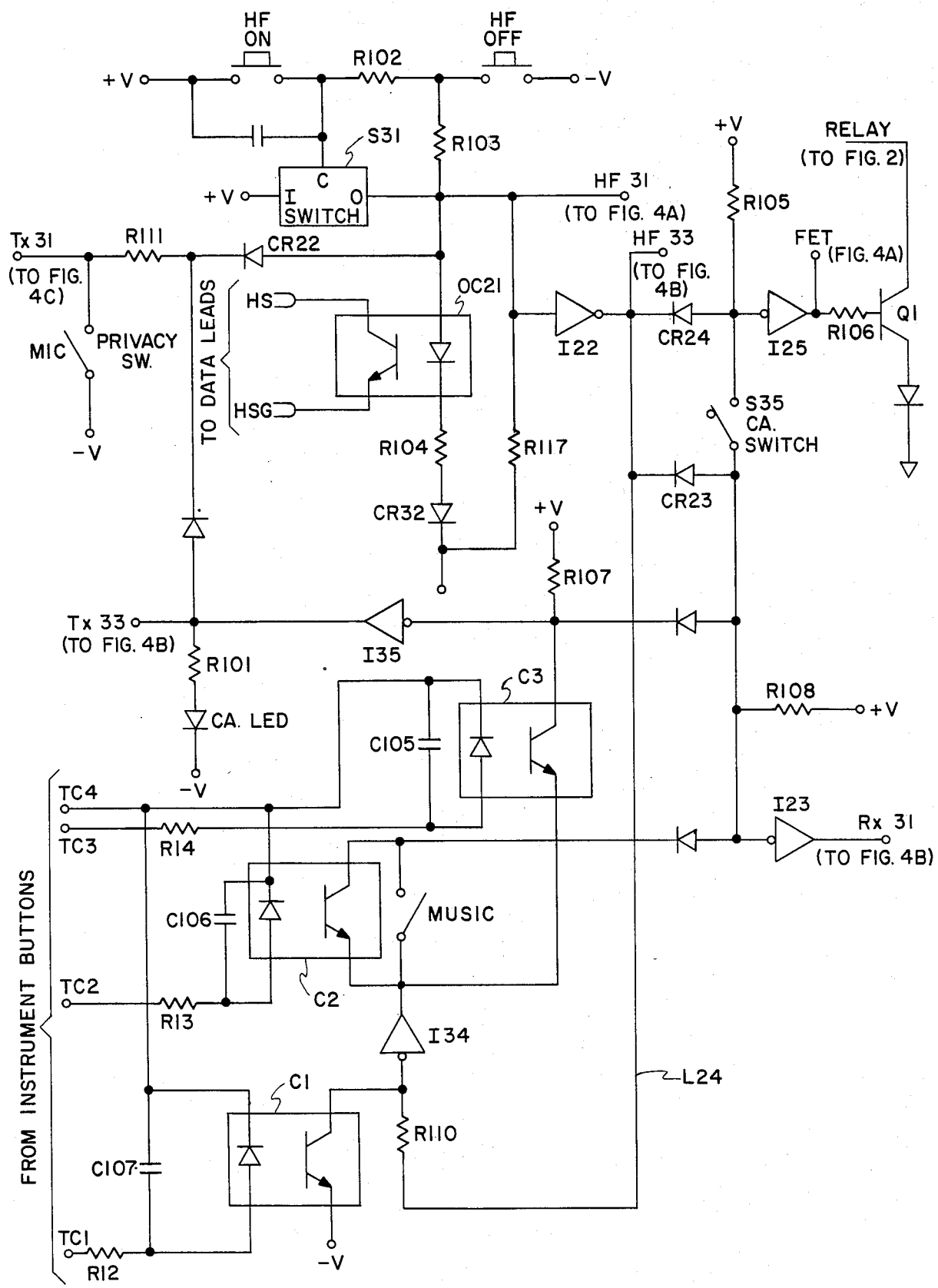
FIG. 3 is a schematic circuit diagram of the logic circuitry for the call announce and handsfree features.

FIG. 3 shows the handsfree logic which responds to depression of a momentary handsfree switch (HF ON) to close a gating path to the control terminal of a CMOS analog bilateral switch S31. A number of CMOS bilateral switches similar to switch 31 are used in the circuit of FIGS. 3 and 4, each switch in question having three terminals, an input, an output and a control terminal for completing the circuit between input and output terminals. As used in the circuit of FIGS. 3 and 4A–C, some of these switches are used as normal switches, which restore when the initiating control signal is terminated, and others are used as inverters.

Completion of the path through semiconductive switch S31 initiates handsfree or loudspeaking service by placing a +V signal on the output of switch S31. The output of switch S31 is coupled through resistors R103 and R102 to the control terminal C of the switch S31 so that the switch latches into the handsfree condition or mode once set by the switch operation.

The resulting +V or high signal is transmitted to a number of locations. The high signal is applied to lead HF31 to ground the handset receiver as will be explained. The signal is sent through diode CR22 and resistor R111 to the Tx 31 lead to enable the transmit path. The +V signals are sent through the diode of optical coupler OC21 to light the HF LED CR32 indicating the handsfree actuation. The output of coupler OC21 provides a signal indicative of a handsfree operation on leads HS and HSG for the data leads when used with an instrument of the type shown by the cited Davis patent. The +V signal is inverted in inverter I22 and a low signal is placed on the HF 33 lead to enable gain control in the receive switching path. The low signal from inverter I22 passes through diode CR23 to inverter I23 to further enable the receive path and the output speaker over the Rx 31 terminal. The low signal at the output of inverter I22 is passed over lead L24 to inverter I34 to bias the call announce outputs of optical couplers C2 and C3 to prevent their operation.

The low signal at the output of inverter I22 passes through diode CR24 to inverter I25. The output high signal of this inverter is fed to the FET lead and to the base of transistor Q1. This transistor conducts and places a ground on the RELAY lead to operate relay RLY1 (FIG. 2) to switch the speech network to handsfree operation and to inactivate the handset receiver and transmitter.

Also in the circuit of FIG. 3 are optical couplers C1, C2 and C3 each of which has a diode coupled optically to respective photo transistors. The input terminals TC1, TC2 and TC3 are output leads from manually operable control buttons and data leads (not shown) of the station instrument; C1 indicating a power down condition, C2 indicating an all call or paging input and C3 indicating a two way call announce input. If none of the optical couplers are active, a fourth mode of background music is initiated.

Further in FIG. 3, there is a manual microphone switch labeled MIC 31 which is closed manually to provide privacy by muting the transmit path and by forwarding a −V signal to the transmit path over the Tx 31 lead as will be explained relative to FIGS. 4A–C.

Figure 4A:
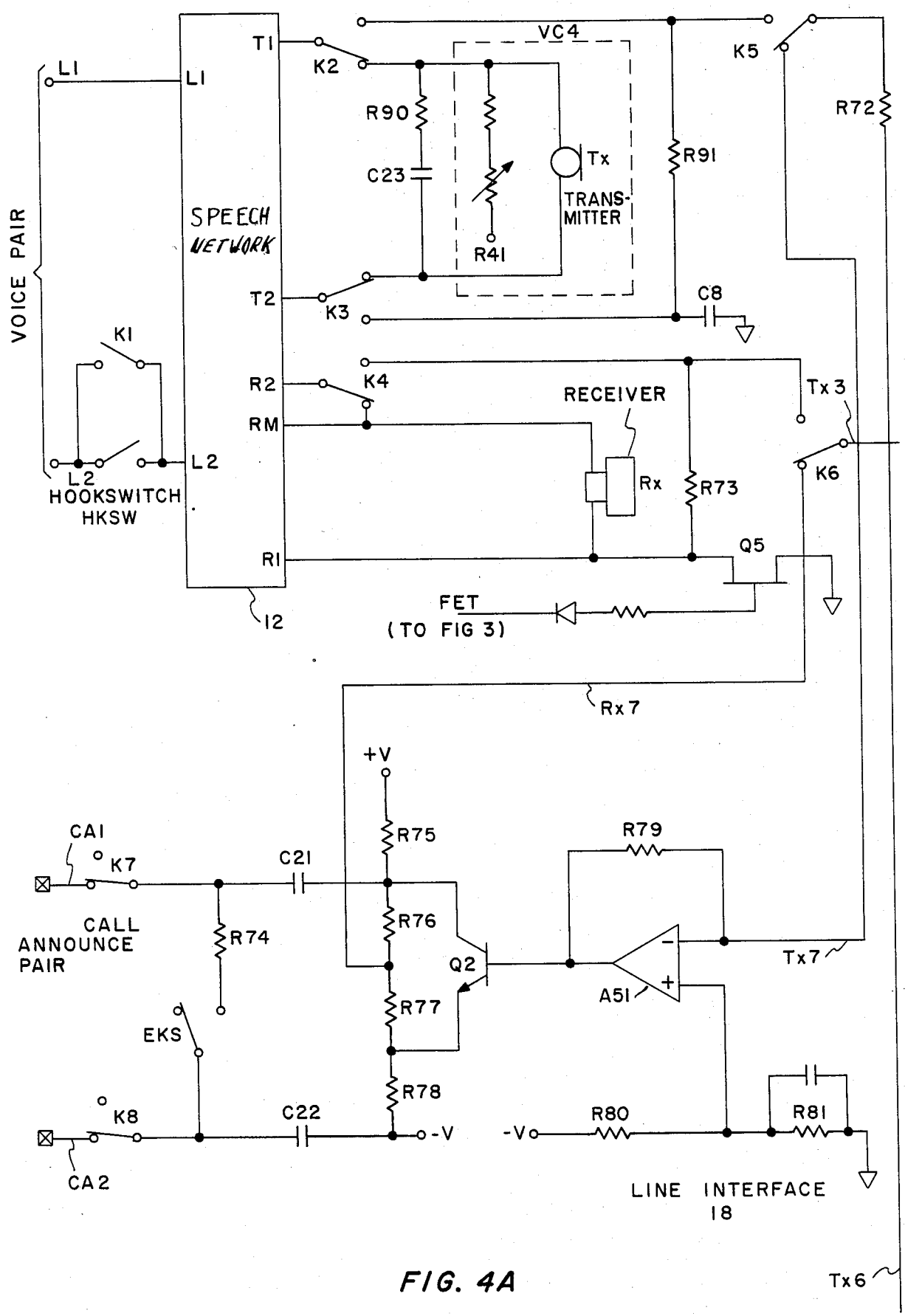
FIG. 4 is a block diagram of the arrangement of the placement of FIGS. 4A, 4B and 4C to form the voice switching circuit, line interface and handset components of the circuit of FIG. 1.

In FIG. 4A is shown the voice pair L1 and L2 providing a path from the line to the speech network 12. Lead L2 includes the two parallel contacts K1 of relay RLY1 and HKSW, as previously described. The output of the speech network includes two transmit leads T1 and T2 and three receive leads R1, R2 and RM.

Leads T1, T2 and R2 contain contacts of relay RLY1, the contacts being K2, K3 and K4, respectively. In the normal position as shown in FIG. 4A, these contacts close a path from the speech network to the handset transmitter and receiver and retain the path to the handsfree circuit in an open circuit condition. The handset transmitter has a volume control network VC4 including a variable resistance R41. In receiver lead R1, there is the drain—source path of a junction gate field effect transistor Q5 which receives its gate signal from lead FET in response to the closure of the handsfree button as described previously. Operation of transistor Q5 places ground on the R1 lead to the speech network 12 to ground the network.

The contacts of relay RLY1 act to switch the path from the speech network between the handset mode and the handsfree mode for both the transmit and receive paths to enable use of the speech network functions previously noted for the handsfree mode of operation.

Figure 4B:
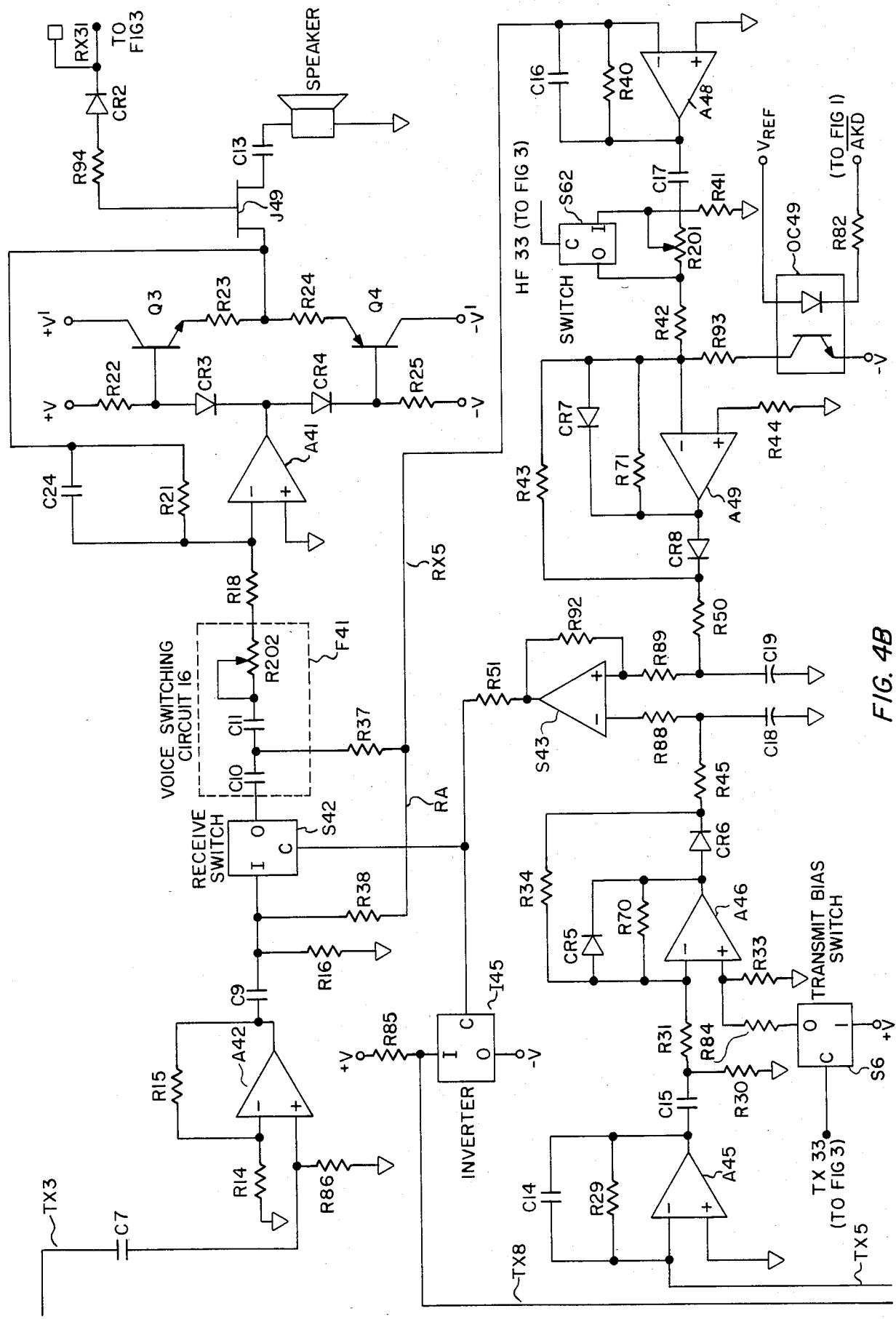

The receive path for handsfree operation can be followed from lead R2 through contacts K4 and K6, isolating capacitor C7 to the receive preamplifier A42 and to the input of receive switch S42 (Note FIG. 4B). The gate or control terminal of switch S42 is tied to the output of the switching comparator S43. The remainder of the receive path on the output of switch S42 is a filter network F41 leading to an amplifier A41 whose output passes to the power output stage comprised of Q3, Q4, CR3, CR4, and R22-R25. The FET transistor J49 once enabled by the Rx 31 lead from FIG. 3 on initiation of handsfree operation enables the output handsfree speaker.

The transmit path can be followed from the electret microphone MIC (FIG. 4C) of the handsfree network to an input of the transmit preamplifier A44. The output of this preamp is fed to the input of transmit mute switch S44. The control of this switch, is gated from the Tx 31 lead of FIG. 3 responsive to closure of the MIC privacy switch. With the Tx 31 lead enabled, the output of switch S44 is connected to the input of switch S45, gated from the comparator S43 through inverter I45 (Note FIG. 4B). From the output of transmit switch S45, the transmit path passes through contacts K5 and K2 (closed for handsfree) to the speech network.

In both the transmit and receive paths, there is a tap-off for sending signals to the comparator prior to the respective path switch (S45 for transmit and S42 for receive) for control of the direction of switching of comparator S43.

For the transmit direction, the comparison path passes through amplifier A44, switches S44 and S45, amplifiers A45 and A46 to the negative terminal of switching comparator S43. For the receive direction, the signal to the input of switch S42 is transmitted over lead Rx5 to amplifiers A48 and A49 to the positive terminal of switching comparator S43. This comparator and its input circuits perform the function of the similar comparator of the cited Moniak et al patent.

As shown by the cited Moniak patent for each direction of operation in the handsfree mode, there is added an incremental signal provided to the comparator input when the comparator has switched to that direction. For the transmit direction, lead TA at the output of transmit switch S45 adds an additional signals to the signal value provided at the input of the transmit switch to bias the direction of operation accordingly. For the receive direction, the incremental path is through lead RA at the output of switch S42 which adds additional signals to the receive direction when switched on in that direction.

To return the instrument from the handsfree condition, HF OFF button (FIG. 3) is depressed momentarily to deactivate the control lead of switch S31 and place a −V signal on leads HF31, and to cause relay RLY1 to shut off and restore its contacts to their inoperative condition.

The main body of the circuit of FIG. 4 is used both for handsfree, as described, and for call announce. The comparator switching logic of FIGS. 4A-C is used for call announcing to cause switching through the higher amplitude signal. However, for two way call announcing, the logic is biased to restore to the transmit direction through the use of switch S36 activated from its control terminal by the Tx 33 lead from FIG. 3. This lead is enabled from optical coupler C3 in response to a signal on lead C3 from the date input leads.

HANDSET OPERATION

With the instrument in the handset mode, as shown in FIGS. 1 and 4, the K contacts of relay RL1 are in their unoperated condition completing a path from the speech network to the transmitter and receiver for the handset. As mentioned previously, the showing of FIGS. 1 and 4 covers a telephone instrument in which there are six leads, i.e., a data pair, a voice pair and a call announce pair. Ring signals are received on the data pair and do not affect the voice pair. On closure of the hookswitch, the receiver and transmitter are coupled to the voice pair line leads through the speech network for normal operation. The handsfree network is inactivated through the open circuits at contacts K2 and K4. The voice switching circuit 16 of FIG. 1 is switched to the call announce pair over the normally closed contacts to enable incoming call announcing into the loudspeaker, as will be explained subsequently.

In systems without the separate call announce leads and terminals of FIG. 4A, i.e. the two wire call announce, there is no use of the call announce feature when the instrument is in the handset mode.

HANDSFREE OPERATION

When handsfree operation is desired, the momentary HF ON button of FIG. 3 is depressed to gate the switch S31 on. The switch latches on until shut off by depression of the HF OFF button. The high or +V signal on the output of switch S31 turns on the optical coupler OC21 to signal the handsfree condition to data leads HS and HSG. LED CR32 is turned on to provide a visual signal that the circuit is in its handsfree mode. The high signal on the output of switch S31 is passed to the Tx 31 lead to switch S44 of FIG. 4C to enable the switch for transmitted signals from microphone MIC (FIG. 4C).

The high signal is inverted in inverter I22 to a low signal (1) on HF 33 lead, (2) for transmission to Rx 31 lead, (3) on lead L24 to bias the optical couplers C1-C3 against call announce operation, (4) to inverter I25, transistor Q1 and relay RLY1 and (5) to enable the FET lead to transistor Q5.

Taking these signals in the order presented, the low or −V signal on the HF 33 lead is transmitted to the receive lead handsfree only switch S62 (FIG. 4B) in the handsfree receive path to bypass the variable resistance R101 to enable the receive gain control.

The low signal on lead L24 passes through diode CR23 and is inverted in inverter I23 and the resulting high signal is sent to the Rx 31 lead to FIG. 4B to cause FET J49 to conduct and enable the path to the speaker for handsfree operation.

The low signal on lead L24 is inverted to a high signal in I34 to prevent couplers C2 and C3 from producing a call announce enabling output.

The low signal through diode CR24 is inverted in inverter I25 to gate transistor Q1 and send a ground signal to the RELAY lead to FIG. 2 to operate relay RLY1 over a circuit to the bridge rectifier CR4–CR7. The relay is energized and closes its contacts K1–K8. The contacts of the relay appear in FIGS. 4A, B and C.

Contacts K1 close the L2 lead from the voice lead L2 to the like terminal on the speech network. Contacts K2, K3 and K4 close the output of the speech network to the handsfree leads and open the circuits to the handset transmitter and receiver. Contacts K5 and K6 switch to complete the transmit and receive paths. Contacts K7 and K8 open to open the call announce pair leads.

The circuit is now in condition to receive signals from the line for handsfree operation and to channel these signals to the receive circuit through capacitor C7 and to amplifier A42 and switch S42 in the receive path (Note FIG. 4B).

The circuit from the microphone MIC (FIG. 4C) is also enabled at switch S44. Voice signals received on the receive path through amplifier A42 and lead Rx 5 are passed to the +input of comparator S43. For the transmit direction, the high signal on lead Tx 31 is sent to FIG. 4C to enable the switch S44. Signals from the microphone MIC are passed through amplifier A44 and enabled switch S44. The signals on lead Tx 5 pass through amplifier A45 and A46 to comparator S43 for comparison against receive signals. If the transmitted signal is greater, comparator S43 produces an output to the control input of inverter I45 to produce a signal on lead Tx 8 to enable the transmit switch S45. The speech signals being transmitted are passed by switch S45 over lead Tx 6 to contacts K5, K2 and the speech network to the line. Augmenting signals on lead TA provides a greater signal to the transmit comparison for the purpose set out in the cited Moniak et al patent.

Since each signal to the comparator is sent from the input side of the transmit switch S45 and the receive switch S42, these signals are continuously sent to the comparator with the circuit in the handsfree mode.

From the foregoing it can be seen that the position of the hookswitch—on hook or off hook—is of no consequence to the handsfree mode of operation. Closure of the HF ON button initiates the handsfree operation by setting the handsfree switch S31 and activating the handsfree switching network, completing the handsfree circuit paths and inactivating the handset and call announce paths.

In FIG. 4B, the receive network includes an AKD terminal connected to an optocoupler diode OC49. This lead (any key down) corresponds to the common switch function of a conventional inductive push button dial. With any key depressed and the network in the handsfree mode, the AKD lead produces a signal to operate optical coupler OC49. The photo transistor output through resistor R93 and amplifier A49 acts to bias the comparator S43 to the receive mode so that dialed tone signals can be heard by the speaker, so called confidence tone. When the depressed button is released, the coupler OC49 shuts off and the handsfree operation returns to its normal state. If the instrument is not in the handsfree mode, the AKD lead is of no consequence.

To remove the circuit from the handsfree mode, the momentary HF OFF button of FIG. 3A is depressed. Depression of this button places a −V signal on the control lead of switch S31 shutting off the switch and inactivating the handsfree circuit by shutting off the relay RLY1, and restoring the circuit to the handset mode.

TWO WAY CALL ANNOUNCE USING CALL ANNOUNCE PAIR

With the circuit in the handset mode, two way call announce calls may be received and transmitted, if the system has the call announce pair of leads of FIG. 4A. The operation of the circuit is as follows for incoming calls: the 2 wire/4 wire switch S35 of FIG. 3 is open. An input signal on lead TC3 of FIG. 3 is received from the data leads responsive to depression of a call announce button at the sending station. Closure of the button activates the optical coupler diode C3 of FIG. 3. This path remains closed as long as call announcing is required and in process. The output of this diode is received by the phototransistor of coupler C3 to render the transistor conductive. Inverter I34 transmits a low signal on its output which is passed through coupler C3. This low signal is transmitted to inverter I35 to produce a high signal (a) on the Tx 33 lead and (b) to the Tx 31 lead. The low signal through coupler C3 is converted to a high signal through inverter I23 for the Rx 31 lead. Relay RLY1 is not operated at this time.

The Tx 33 lead high signal is sent to the control lead of switch S6 of FIG. 4B to place a d.c. bias through resistor R84 on the +input of amplifier A46. This positive signal biases the transmit side over the receive side in the absence of signals so that the transmit network is in control.

With RLY 1 unoperated and an Rx 31 lead signal enabling the speaker through transistor J49 (FIG. 4B) and the transmit Tx 31 lead closing the input output path of switch S44 (FIG. 4C), initiated signals from microphone MIC are sent through the transmit path through amplifier A44 and switches S44 (enabled) and S45 (enabled on transmit signal being greater in amplitude than receive signal) over lead Tx6, resistor R72, contacts K5 and amplifier A51 and the base of transistor Q2 to the call announce pair.

Incoming call announce signals are received over the call announce pair and are transmitted through the divider of R75, R76, R77 and R78 of the electronic hybrid or balance network to lead Rx7, through contacts K6 to the receive path of amplifier A42, Receive Switch S42 (when enabled due to the receive signal being greater in amplitude than the transmit signal), filter network F41, amplifier A41, power output stage, to the J49 (enabled by Rx31 lead signal) and the speaker.

For call announcing, the comparator controls the switching direction and the enabling of either switch S42 for receive or S45 for transmit in the same manner as for handsfree. The two major differences between operation of the voice switching circuit for handsfree and call announce are: (1) bias in favor of transmit for call announce (CA), no bias for handsfree and (2) bypassing of the HF Pot R202 (FIG. 4B) in handsfree and use of this resistance in call announce. Since call announce calls are always local, the line loop attenuation for call announce is always low allowing the settable potentiometer R202 to be passed; while in the handsfree mode potentiometer R202 compensates for the loop attenuation.

For outgoing signals in the two way call announce mode using the call announce pair, the microphone MIC of FIG. 4C generates the voice initiated signals. With a Tx 31 signal on switch S44 to enable the transmit path for signals to the comparator and to the transmit leads Tx 5, TA, and Tx 6. The outgoing voice signals on lead Tx 6 pass through contacts K5 to lead Tx 7 at the input to amplifier A51. The speech signals are amplified and drive transistor Q2 to emit the call announce voice signals on the call announce leads CA1 and 2.

When the call announce is to be terminated, the signal on lead TC3 is removed and the circuit restores.

CALL ANNOUNCE—OVER VOICE PAIR

When two way call announcing is to use the voice pair (no call announce pair being provided) switch S35 (FIG. 3) is maintained in a closed position. With this switch closed, operation of optical coupler C3 initiating call announce will cause relay RLY1 to operate in addition to transmitting signals to terminals Tx 33, Tx 31 and Rx 31 as previously described.

With relay RLY1 energized, the voice pair is switched through the speech network and closed contacts K2, K3, K4, K5 and K6 to use the handsfree circuit in the same manner as handsfree use.

When call announce is to be ended, the signal on lead TC3 is terminated and the circuit restores.

ALL CALL ANNOUNCE

This feature is similar to a one way paging of all stations equipped with a call announce speaker.

This mode of operation is initiated by an all call signal over the data lead TC2 of FIG. 3 which energizes the LED of coupler C2. The output transistor stage of this optical coupler in FIG. 3 becomes conductive to cause a low signal to be sent toward the receive mute Rx 31 lead. The signal is inverted in inverter I23 and sent to the Rx 31 lead enabling transistor J49 and the speaker. If the call announce pair is available and in use, the speech or voice message will enter via the call announce pair and be sent over lead Rx7 and contacts K6 to the receive path. The message will be broadcast over the speaker.

If the call announce pair is not present or not being used, CA switch S35 (of FIG. 3) will be closed, causing relay RLY1 to be energized along with the Rx 31 signal. The Tx path is not activated since no signal on lead Tx 31 is sent.

At the end of the call, the signal on lead TC2 is terminated and the circuit restores. Absence of signals on any input TC1, TC2 or TC3 indicative of an idle condition, allows background music to be sent to the speaker.

What is claimed is:

1. A telephone instrument having a handset mode of operation using a handset having a transmitter and receiver, a handfree mode of operation using a microphone and loudspeaker responsive to the operation of at least one switch at said instrument, and a call announce mode of operation using at least said loudspeaker of said instrument in response to a signal from a telephone system to which said instrument is connected; said instrument including a speech network powered from a two wire speech pair of a line to said telephone system to provide gain regulation and a hybrid for a speech path of said instrument, a transmit path for transmitting voice signals from said microphone, and a receive path for transmitting voice signals toward said loudspeaker means for switching said speech network between connection to said handset and connection to said transmit and receive paths, a voice switching network with inputs from both said transmit and receive paths for switching one of said transmit and receive paths to an operative status and the other of said transmit and receive paths to an attenuated status responsive to a comparison of the amplitudes of speech signals in said transmit and receive paths, means in said instrument for operating said means for switching to enable said transmit and receive paths for bidirectional signal transmission through said voice switching network and for inactivating said handset transmitter and receiver, and means in said instrument responsive to signals from said system for enabling at least said receive path for coupling to said speech network for reception of speech signals for said call announce mode.

2. A telephone instrument as claimed in claim 1, in which said voice switching network includes comparator means for performing said comparison, and switching means in each path coupled to the output of said comparator means for switching one path to an active state in response to a signal from said comparator means that the signal from said one path is greater in amplitude than the signal from the other path.

3. A telephone instrument as claimed in claim 1, in which there is first means for enabling both said microphone and said loudspeaker in response to a signal from said system that bidirectional call announcing is to be implemented, and second means for enabling said transmit path, said receive path and said voice switching network in response to said first means.

4. A circuit for operating a telephone instrument in one of a plurality of modes dependent on signals generated at said instrument and on signals from a system to which the instrument is connected, said circuit including a transmitter and a receiver operative with said circuit in a handset mode, a loudspeaker and a microphone enabled with said circuit in a handsfree mode in response to operation of a manual switch to generate signals to enable said handsfree mode, a loudspeaker network including amplifiers and switching means for transmitting voice signals to said loudspeaker, a microphone network including amplifiers and switching means for transmitting voice signals from said microphone, a voice switching network receptive of voice signals from said microphone and voice signals directed toward said speaker in said handsfree mode for switching one of said networks on and for attenuating voice signals in the other network, means responsive to signals from the system for switching the system to a call announce mode and for activating said voice switching network, said voice switching network responsive to voice signals when in the call announce mode for switching one of said networks to transmit signals through said one network, and means responsive to signals from said system for enabling only said loudspeaker network to enable the receipt of signals for a receive only call announce mode.

5. A circuit as claimed in claim 4, in which there is a speech network including gain regulation, said speech network coupled to the two wire line voice pair from the instrument to the system for powering said instrument speech network, transmitter and receiver from the two wire line, and means for switching the output of said speech network to said voice switching network through the loudspeaker network and the microphone network for transmission through one of the microphone and loudspeaker networks.

6. A circuit as claimed in claim 4, in which both said means responsive to said signals from the system are optical couplers comprising light emitting diodes emissive of light during the transmission of said signals from the system and phototransistor outputs for each of said diodes for enabling the networks.

* * * * *